(12) United States Patent
Beckmann et al.

(10) Patent No.: US 10,705,962 B2
(45) Date of Patent: Jul. 7, 2020

(54) SUPPORTING ADAPTIVE SHARED CACHE MANAGEMENT

(71) Applicant: Intel Corporation, Santa Clara, CA (US)

(72) Inventors: Carl J. Beckmann, Newton, MA (US); Robert G. Blankenship, Tacoma, WA (US); Chyi-Chang Miao, Sharon, MA (US); Chitra Natarajan, Flushing, NY (US); Anthony-Trung D. Nguyen, Castro Valley, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 15/850,865

(22) Filed: Dec. 21, 2017

(65) Prior Publication Data

US 2019/0196968 A1 Jun. 27, 2019

(51) Int. Cl.
| | | |
|---|---|---|
| *G06F 12/00* | (2006.01) |
| *G06F 12/084* | (2016.01) |
| *G06F 12/123* | (2016.01) |
| *G06F 12/0811* | (2016.01) |
| *G06F 12/128* | (2016.01) |
| *G06F 12/0868* | (2016.01) |
| *G06F 12/0897* | (2016.01) |
| *G06F 12/0862* | (2016.01) |
| *G06F 12/127* | (2016.01) |

(52) U.S. Cl.
CPC ........ *G06F 12/084* (2013.01); *G06F 12/0811* (2013.01); *G06F 12/0862* (2013.01); *G06F 12/0868* (2013.01); *G06F 12/0897* (2013.01); *G06F 12/123* (2013.01); *G06F 12/127* (2013.01); *G06F 12/128* (2013.01); *G06F 2212/283* (2013.01); *G06F 2212/621* (2013.01)

(58) Field of Classification Search
None
See application file for complete search history.

(56) References Cited

U.S. PATENT DOCUMENTS

2014/0181413 A1* 6/2014 Manne ................ G06F 12/0891
                                                  711/135
2019/0095330 A1* 3/2019 Roberts ............... G06F 12/0831

\* cited by examiner

*Primary Examiner* — Midys Rojas
(74) *Attorney, Agent, or Firm* — Lowenstein Sandler LLP

(57) ABSTRACT

Embodiment of this disclosure provides a mechanism to use a portion of an inactive processing element's private cache as an extended last-level cache storage space to adaptively adjust the size of shared cache. In one embodiment, a processing device is provided. The processing device comprising a cache controller is to identify a cache line to evict from a shared cache. An inactive processing core is selected by the cache controller from a plurality of processing cores associated with the shared cache. Then, a private cache of the inactive processing core is notified of an identifier of a cache line associated with the shared cache. Thereupon, the cache line is evicted from the shared cache to install in the private cache.

17 Claims, 12 Drawing Sheets

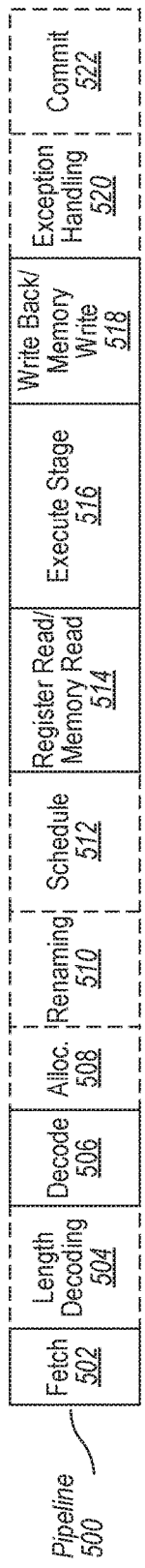
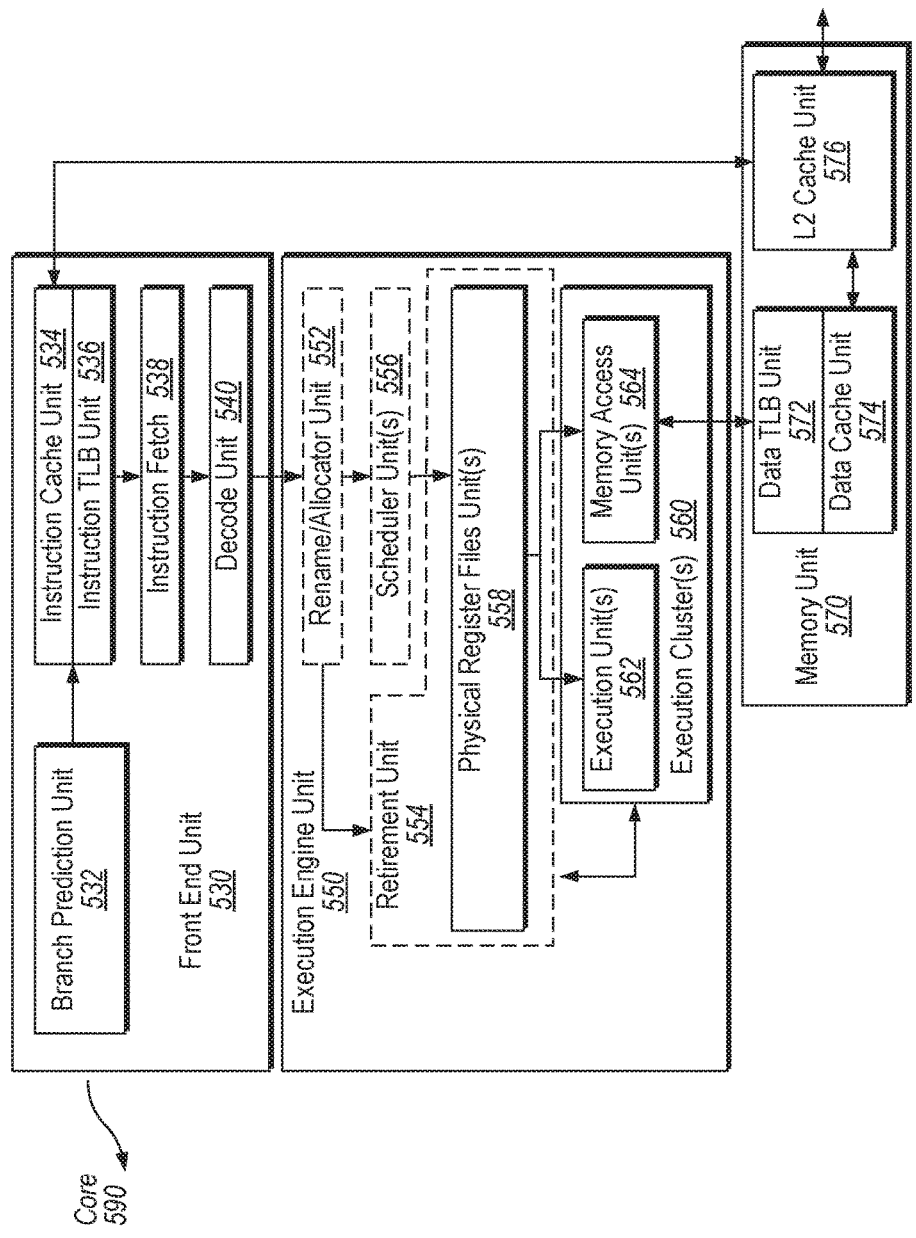
FIG. 5A
FIG. 5B

SUPPORTING ADAPTIVE SHARED CACHE MANAGEMENT

GOVERNMENT LICENSE RIGHTS

This invention was made with Government support under contract DE-AC02-05CH11231 awarded by DOE. The Government has certain rights in this invention.

TECHNICAL FIELD

Embodiments of the disclosure relate generally to computer processor architectures, and more specifically, but without limitation, to supporting adaptive shared cache management.

BACKGROUND

Multi-core processors are found in most computing systems today, including servers, desktops and a System on a Chip (SoC). Such multi-core processors may include cache memory that is used for high-speed multi-threaded applications to support, for example, various types of parallel computing.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor according to one embodiment.

FIG. 5B is a block diagram illustrating an in-order pipeline and a register renaming stage, out-of-order issue/execution pipeline according to one embodiment.

DETAILED DESCRIPTION

Figure 1:
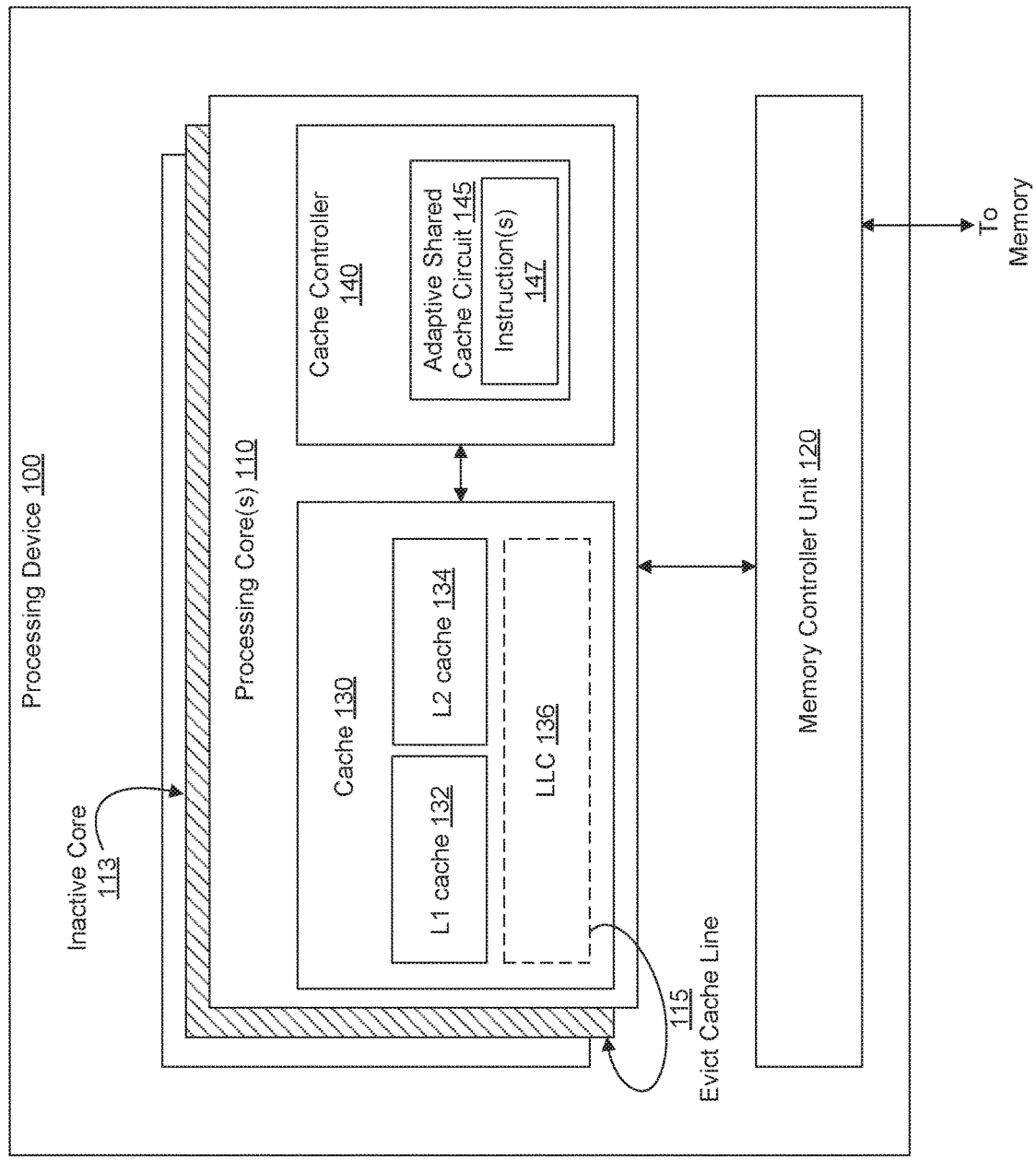
FIG. 1 illustrates a block diagram of a processing device to support adaptive shared cache management according to one embodiment.

Computing systems may achieve high performance and energy efficiency by incorporating certain processing elements (e.g., processing cores and/or special purpose processors comprising a plurality of processing cores) to handle specific computing tasks. In such systems, these processing elements may share common hardware components that include, but not limited to, on-die fabric, shared caches, in-package memory, network fabric, etc. To achieve high performance, each of the processing elements may be associated with cache memory. For example, in order to reduce memory access time in these types of systems, a high-speed memory called a "cache" is used to temporarily store lines of data (also referred to as a cache lines) which are currently in use by a processing element.

A "cache line" is a basic unit of storage in a cache. The cache line can include a copy of instructions and/or data obtained from main memory for quick access by the processing element. Data stored in the cache may be accessed by the processing element, rather than stalling and waiting for the retrieval of this data from the main memory. For example, when the processing element requests a data item from the main memory, the cache is accessed first for the data when the processing element processes a memory access instruction. If the data item is not in cache also referred to as a cache "miss", the data is then retrieved from main memory and copied into the cache.

The cache may be associated with a cache hierarchy that includes a private cache accessible only by a particular processing element and a shared cache that is accessible to all of the processing elements. The cache hierarchy may include, for example, multiple levels referred to as L1, L2 and L3. The L1 and L2 levels are private to each processing elements while the level L3 also referred to as the Last Level Cache (LLC) is shared between processing elements. The cache hierarchy is designed to provide different fast cache access latencies. For example, the L1 cache is the smallest of the levels that runs at the fastest speed, the L2 cache is the next smallest level that runs at the next fastest speed, while the LLC shared cache is the largest (e.g., several megabytes in size) and runs at the slowest speed. The LLC is usually accessed if the data requested in a memory access request cannot be found in L1 or L2. If this data item is not in the LLC also referred to as a cache "miss", the data is then copied into the cache from main memory.

Certain applications executing on the computing system may display different memory access behavior based on the cache configuration. For example, some applications perform better when more private data is kept in the cache. In view of this, because the total on-die cache storage is constrained by the physical size of the die, more cache may be reserved privately for each individual processing element leaving less die area available for the shared cache. These types of cache capacity constraints, however, can lead to adverse system performance issues. For example, in order to make room for a new entry in the LLC on a cache miss, the cache may have to evict an existing cache line (victim line) due the constraints on the size of the cache. When a subsequent request to the victim line is received, this generates a memory access to bring the line back to the cache system again. In this regard, such misses related to the limited cache capacity can greatly degrade the performance of the system and exacerbate memory bandwidth usage in the system.

Embodiments of the disclosure address the above-mentioned problems and other deficiencies by providing techniques to use a portion of an inactive processing element's (e.g., processing core) private cache as extended LLC storage space to adaptively adjust the shared cache size. In this way, the shared cache capacity of the system can increase without the necessity of adding hardware storage/cost or sacrificing performance tradeoffs. In most computing systems, all processing elements are not active at the same time. Once a processing element becomes inactive, the private cache (e.g., L2) associated with that element may be turned off. In embodiments, the cache controller may implement adaptive shared cache logic (e.g., hardware component, circuitry, dedicated logic, programmable logic, microcode, etc.) to reclaim the private cache from inactive processing elements (e.g., processing cores). The reclaimed private cache storage may then be used by the cache controller as an extended portion of the LLC for storing data, rather than sending that data back to main memory.

In operation, the cache controller may identify a cache line (e.g., victim line) to evict from the LLC when space in the LLC is needed for a new cache-line. For example, a least-recently-used (LRU) algorithm or other type of similar methods may be used to select a victim line to remove from the LLC. Instead of immediately sending the victim line back to main memory, the cache controller may determine whether there is a private cache storage associated with an inactive processing element that can be used as shared cache storage. In one embodiment, the active status of the processing cores may be tracked by hardware. In other embodiments, the system software (e.g., host operating system) may include information on which processing elements are active and inactive. The cache controller may receive this information from the system software to identify a potential target (e.g., inactive processing element) for installing the victim line.

In some embodiment, the cache controller transmits a message (e.g., a prefetch hint) to the target (e.g., an inactive processing element) to request if the victim line can be installed or otherwise prefetched into the target's unused private cache. This message may include an identifier (e.g., a memory address) of the victim line to be written to the L2 level of the private cache of the target. The LLC cache controller may then receive a read request from the target of data for the victim line. This read request of the victim line in the LLC indicates that the target is confirming the request to prefetch the victim line based on the prefetch hint. For example, a processing element can sometimes prefetch data before it is needed by the processor. The prefetch can either be triggered by software or hardware of the processor. In some implementations, the shared cache controller sends hints (prefetch hint) to the processing element to suggest the next request address that should be prefetched. In some embodiments, the cache controller may engage the prefetch hint implementation using a prefetch hint message to initiate an operation by the inactive processing element to prefetch the LLC victims. Once the controller associated with the inactive processing element receives such messages, it brings the victims into its unused private cache storage.

Any active processing element that makes a subsequent memory request to the victim line may obtain that line from the inactive element's private L2 as part of a cache-to-cache transfer of the data, rather than a slower retrieval of the data from main memory. The victim line, in embodiments, is written to the L2 level of the private cache. As a result, if the inactive processing element becomes active again the victim line may be routinely written back to the LLC by the processing element. For example, when the computing system is powered off and then back on, some systems may flush the private cache back to the LLC.

In some embodiments, if the processing element becomes active again, it may start fetching new data items (e.g., from main memory) to put in the private cache. In such cases, as space gets used in the L2 caches, the processing element may, as part of its routine procedures, evict cache lines to main memory create more space. In other embodiments, the cache controller may be configured to trigger a flush of the victim line out of the private cache. For example, the eviction of the victim line may be triggered by the local L2 private cache running out of space, and, therefore, triggers existing eviction procedures that evicts the victim line out of the inactive processing core's private cache to the main memory or the newly available memory space in the LLC.

Embodiments of the disclosure may be advantageous for improving processor performance by providing an adaptive size shared cache that can reduce cache capacity misses. In this way, it lowers memory bandwidth usage by reducing the active memory traffic caused by capacity misses, thereby proportionally reducing the memory controller's power consumption. This is because the memory access resulting from a cache "miss" uses more power than a core to core transfer to retrieve the victim line from the inactive core. Another advantage of the techniques disclosed herein is that application developers can enable different cache blocking and prefetching techniques to further optimize the execution of their programs. Moreover, the various techniques and parameters disclosed within may be further scaled to provide additional benefits. For example, if only a first portion of the inactive processing element's L2 cache is used as part of the adaptive LLC, the second portion can be powered down while the other is used further optimizing the power/performance of the processor.

FIG. 1 illustrates a block diagram of a processing device 100 for supporting adaptive shared cache management according to one embodiment. The processing device 100 may be generally referred to as "processor" or "CPU". "Processor" or "CPU" herein shall refer to a device that is capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

In some embodiments, the processing device 100 may execute one or more application programs (not shown) (e.g., a user-level multithreaded application). Such application programs may be executed by system software (not shown) installed at the processing device 100. Examples of system software include, but are not limited to, one or more operating systems, a virtual machine monitor (VMM), a hypervisor, and the like, and combinations thereof. The application programs may use instructions to control the processing device 100 as disclosed herein. The instructions may represent macro-instructions, assembly language instructions, or machine-level instructions that are provided to the processing core 110 for execution.

The processor core(s) 110 may execute instructions for the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller unit 120 may perform functions that enable the processing device 100 to access and communicate with memory (not shown) that includes a volatile memory and/or a non-volatile memory. In some embodiments, the memory controller unit 120 may be located on a processor die associated with processing device 100, while the memory is located off the processor die. In some embodiments, each processing core 110 of the processing device 100 may have a corresponding cache unit 130 to cache instructions and/or data. The cache unit 130 includes, but is not limited to, level one (L1) 132, level two (L2) 134, and last level cache (LLC) 136, or any other configuration of cache memory. For example, the adaptive shared cache is applicable to a variety of cache memory configurations with or without L1, with or without L2, but at least have one level of private cache (usually called L1 if there is only one level) and an LLC (L3).

A "cache" or "cache memory" as used herein, including the L1 cache 132, L2 cache 134 and LLC 136, may be a hardware component associated with the processing device 100 that stores cache lines for use by the processor cores 110. The processor cores 110 may access a cache line within a cache using any operation/instruction (e.g., performing arithmetic or logic functions). A cache line may be a basic unit of storage in a cache and may be referred to as a block or a sector of memory (e.g., a cache) that may be managed as a unit for coherence purposes. In some embodiments, a cache line within a cache may be between 16-256 bytes. A cache line may be stored in cache memory (e.g., in a L1 cache 132, L2 cache 134 and LLC 136), system memory, or combinations thereof. The cache memory may refer to a memory buffer inserted between one or more processors on a bus (not shown), for example, to store/hold currently active copies of cache lines, (e.g., blocks from system (main) memory).

The LLC 136, in embodiments, may be shared by multiple processing cores 110 of processing device 100, and consequently threads executing on each of these cores, or local/dedicated/private to single core of a processor (e.g., not shared). In that regard, the L1 cache 132 and L2 cache 134 may be private, dedicated, and or local to a processing core 110. In some embodiments, the L1 cache 132 and L2 cache 134 operate at a lower-level in the cache unit 130 than the shared cache LLC 136. In one embodiment, the memory controller unit 120 can be connected to the LLC 136 to transfer data between the cache unit 130 and memory. As shown, the cache unit 130 can be integrated into the processing cores 110. The cache unit 130 may store data (e.g., including instructions) that are utilized by one or more components of the processing device 100.

The L1 cache 132 and L2 cache 134 can transfer data to and from the LLC 136. For example, the processing device 100 may include an on-die fabric (not shown) that couples the processing cores 110 and their corresponding private caches (e.g., L1 cache 132 and L2 cache 134) to the shared cache LLC 136, via a cache controller 140. The cache controller 140 may be a hardware and/or software component that implements adaptive shared cache circuit 145 to reclaim a portion of an inactive processing cores' 113 private cache. For example, the reclaimed private cache may be used to adaptively adjust the shared cache size utilized in the processing device 100. Embodiments described herein may be implemented as a set of instructions 147 in the adaptive shared cache circuit 145. In some embodiments, the processor cores 110 of the processing device 100 may execute the instructions 147 of the adaptive shared cache circuit 145 to provide the benefits of the techniques disclosed herein. For example, the instructions 147 of the adaptive shared cache circuit 145 may instruct the cache controller 140 to evict a cache line 115 from the LLC to be installed in the inactive core 113's private cache. Thereby, increasing the available size of the shared cache memory used for high-speed multi-threaded applications without incurring additional cost or performance tradeoffs. As discussed herein, "logic" may refer to hardware (e.g., circuitry, dedicated logic, programmable logic, microcode, etc.), software (such as instructions run on a processing device), firmware, or any combination thereof.

Figure 2:
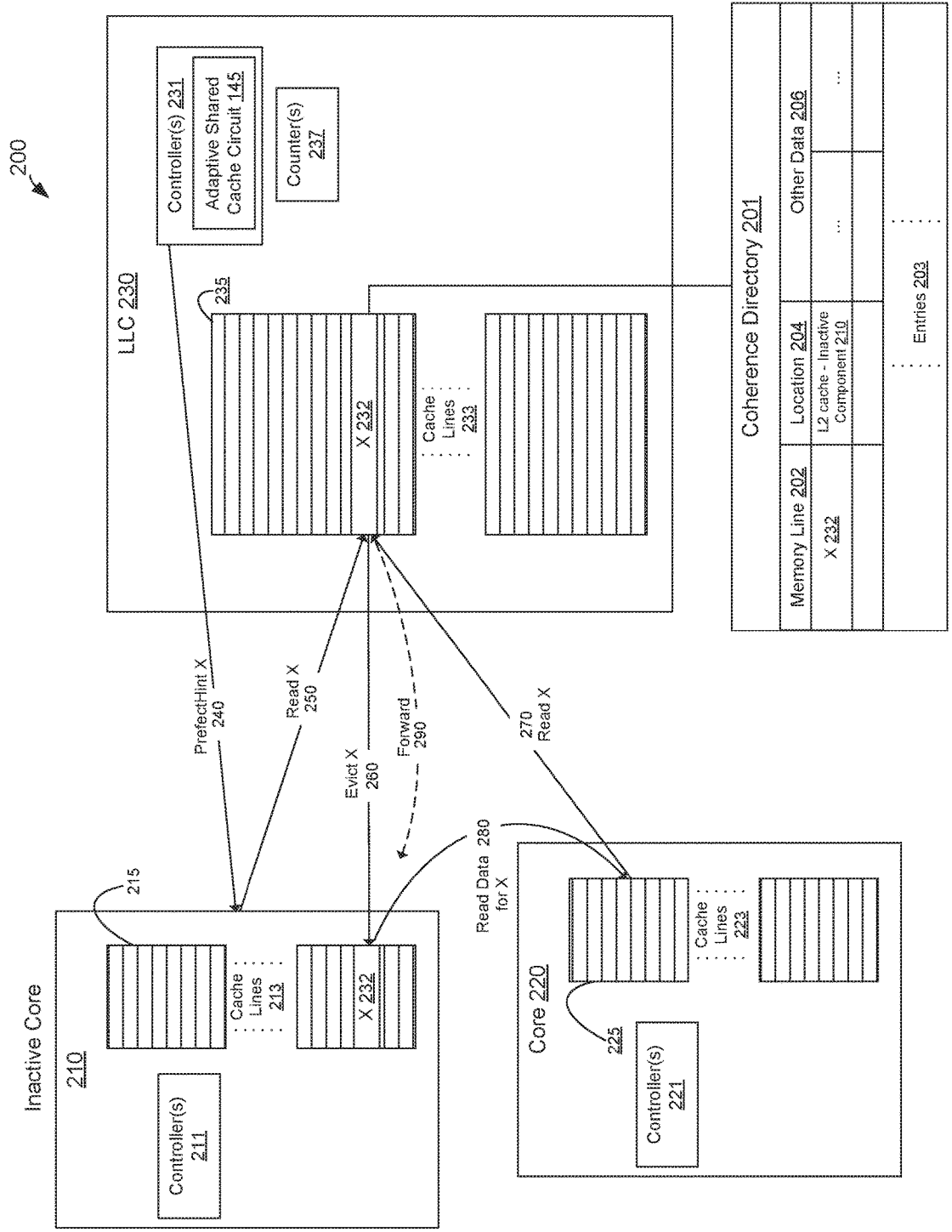
FIG. 2 illustrates a block diagram of a system including a data structure to support adaptive shared cache management according to one embodiment.

FIG. 2 illustrates a block diagram of a system 200 including a data structure (such as coherence directory 201) to support adaptive shared cache management according to one embodiment. The coherency directory 201 is a block of memory which keeps track of which processing cores 210, 220 in a multiprocessor computer system, such as system 200, owns which lines of memory. The system 200 may be the same as processing device 100 and include the adaptive shared cache circuit 145 of FIG. 1. In some embodiments, the system 200 includes a plurality of processing cores 210 and 220 that may be the same as the processing cores 110 of FIG. 1. Each of the processing cores 210 and 220 includes cache memory 215, 225. This cache memory 215, 225 may be private to the respective processing cores 210 and 220. For example, cache memory 215 may be an L2 level private cache of processing cores 210 and cache memory 225 may be an L2 level private cache of processing cores 220. In some embodiments, the system 200 may be associated with a shared cache memory LLC 230 (which may be the same as LLC 336 of FIG. 1) that can be shared by the plurality of processing cores 210 and 220.

Each of the cache memories 215, 225 and 235 is comprised of a number of cache lines 213, 223 and 233, respectively. The cache lines 213, 223 and 233 can include a copy of instructions and/or data obtained from main memory for quick access by the processing cores 210 and 220. In some embodiments, cache memory 215, 225 and 235 is associated with a number of controllers includes controllers 211, 221 and 231. Each of the controllers 211, 221 and 231 may include multiple controllers that can be located inside or outside of a cache memory. The controllers 211, 221 and 231 manage activities of the corresponding cache memories 215, 225 and 235 including adding and evicting the cache lines 213, 223 and 233 from the cache memories 215, 225 and 235.

To keep track of the cache lines 213, 223 and 233 with respect to the cache memories 215, 225 and 235, the system 200 may include a data structure also referred to as coherence directory 201 that is a block of memory comprising a number of entries 203. Although embodiments of the disclosure as discussed with respect to a coherence directory 201, other types of data structures may be implemented by system 200 to keep track of the cache lines 213, 223 and 233. In this embodiment, the coherence directory 201 may be a table or other types of similar data structures to store "coherence data" relating to the cache memories 215, 225 and 235. The coherence data may include information to maintain the consistency of the main memory data that ends up stored in multiple caches. For example, the coherence directory 201 may include coherence data, such as an entry for each cache line 213, 223, 233 of the cache memories 215, 225 and 235 in the system 200. Each entry 203 includes a number of data fields, such as a memory line 202 which may be an identifier of a memory address of a cache line, location information 204 (e.g., an identifier of a processing core associated with the cache line), as well as other data 206 used to keep track of the cache lines 213, 223, 233.

The processing cores 210 and 220 of system 200 operate with respect to the cache memories 215, 225 and 235 by initiating a memory request. For example, an application executed by the processing cores 210 and 220 may initiate a memory operation that includes a memory request to access a particular memory address. In one embodiment, a "hit" occurs if the cache (e.g., cache 235) associated with the processing core (e.g., core 220) stores data for the memory request. In one embodiment, a "miss" occurs if the cache 225 does not store the cache line requested by the memory request of the processing core 220. If a "miss" occurs during a memory request to the cache line in the cache 225, the processing core 220 requests corresponding data from LLC 230 and fills that data in the cache.

When the controller 231 associated with the LLC 230 receives the memory request, it looks for the cache line in the LLC 230. If a "miss" occurs during a memory request to a cache line in the LLC 230, the cache line is retrieved from main memory and stored in the LLC. In some situations, the retrieval and storage of the cache line the LLC 230 may cause the controller 231 to select a victim line to evict back to the main memory in order to create space for the new cache line. Instead of immediately sending this victim line back to main memory, the adaptive shared cache circuit 145 may instruct the controller 231 to determine whether there is an inactive processing core that can be used as shared cache storage to store the victim line. For example, all of the processing cores 210, 220 of system 200 are not active at the same time. When a processing core (e.g., such as processing core 210) becomes inactive, the private cache 215 may be reclaimed and used as an extended portion of the LLC 230 for storing the victim line, rather than sending that line back to main memory.

In operation, the controller 231 as directed by the adaptive shared cache circuit 145 the may initially identify a victim line (e.g., cache line X 232) to evict from the shared cache memory (e.g., LLC 230.) There are, for example several ways that this victim line X 232 from the LLC 230 may be identified. In one embodiment, the victim line X 232 may be selected based on a least-recently-used (LRU) algorithm. The LRU algorithm may be used to identify a victim (cache) line that has not been used for a threshold amount of time. The LRU cache line may be identified based on a counter 237 or a logical clock (such as a hardware register) that can be used to determine the amount of time since the last request to the victim line.

Each cache line 233 of the LLC 230, in embodiments, may be associated with a counter 237 that is adjusted in accordance with the LRU algorithm. Each cache line read out of main memory into the LLC 230, the counter 237 for that line is initialized to 0. Each time that cache line is accessed by a processing core, its counter 237 is incremented. This method requires equipping the hardware with a 64-bit counter (e.g., counter 237) that is automatically incremented after each instruction. As such, the counter with the lowest counter may be selected as the least recently used by the LRU algorithm. In alternative embodiments, other algorithms, such as an aging, random selection algorithm, etc., which (are either based or not based on the counter 237) can be implemented to select a victim line X 232 to evict from the LLC 230 to install in the inactive processing core 210.

Thereupon, the controller 231 may select an inactive processing core 210 among the processing cores 210, 220 of system 200. The inactive processing core 210 may be identified as a potential target to write out information associated with the victim line X 232. For example, system 200 may include information on which processing cores are active and inactive. The controller 231 may receive this information from, for example, system software and/or hardware, to identify the potential target (e.g., inactive processing core 210) for installing the victim line. The controller 231 may detect the inactive processing core 210 by selecting cores that have executed a "HALT" instruction if such an instruction is supported by the instruction set architecture (ISA) of the processing device. In some embodiments, the LLC 230 can track the active and inactive processing cores. For example, system software can update a status registers for LLC 230 to track the inactive cores at 1) system startup time or 2) during the procedure in which one of the processing cores goes from active to inactive. In some embodiments, the controller 231 may choose co-located cores within a particular interconnect that couples all the processing cores to select the inactive processing core 210 that is, e.g., the shortest distance to move the data. In an alternative embodiment, the controller 231 can use the cacheline address of the victim line X 232 to select an inactive processing core 210.

To determine whether inactive processing core 210 will accept the victim line X 232, the controller 231 may transit a message 240 using, for example, an inter-core communication protocol that facilitates message communication between the cores 210, 220 of the system 200. In some embodiments, the message 240 may be between by the cores 210, 220 via a data bus or interconnect of system 200. In some embodiments, the message 240 includes a prefetch hint 240 to initiate a prefetch of the victim line X 232 into cache memory 215 of the inactive processing core 210. In this regard, the controller 211 of the inactive processing core 210 may receive the message and then preform a prefetch of the victim line X 232. For example, a processing core can sometimes prefetch data before it is needed by the processor. The prefetch can either be triggered by software or hardware of the processor. In some implementations, the shared cache controller 231 sends hints (prefetch hint 240) to the processing core 210 to initiate an operation by the inactive processing core 210 to prefetch the victim line X 232 from the LLC 230, and install the line into the core's unused private cache storage (e.g., cache memory 215).

In most of the cases, the controller 211 of the inactive processing core 210 may always try to install the victim lines. In some cases, when there is an internal hardware conflicts in the controller 211, it can decide not to bring the victim lines. The controller 211 still needs to respond to the LLC's controller 231 to indicate the line cannot be brought in. Under such circumstances, the LLC 230 may then evict the victim line X 232 back to the main memory. In other cases, it is possible that in between sending and receiving the prefetch hint message 240, the inactive core 210 becomes active again, e.g. due to an interrupt or other event. In that case, the core 210 may choose to ignore the prefetch hint 240 request, and may send back a negative-acknowledgement so that coherence directory 201 does not associate the victim line X 232 with core 210.

If the inactive core accepts the request, the controller 231 of the LLC 230 may receive a read request 250 from the private cache 210 of the inactive core 210 for data of the victim line X 232. For example, the read request 250 may include an identifier (e.g., memory address) of the victim line X 232. The controller 231 may then provide or otherwise forward the data to the private cache 215 of the inactive processing core 210 responsive to the read request 250, which then writes the data of the victim line X 232 to the private cache (e.g. L2 cached) 215 of the inactive processing core 210. For example, the controller 231 creates a copy of the victim line X 232 in an available space in the private cache 215 of the inactive processing core 210. Thereupon, an entry in the coherence directory 201 for the victim line X 232 is updated to indicate that the line is located in the cache of the inactive processing core 210.

If an active processing core of system 200 makes a subsequent memory request to the victim line X 232, it may obtain that line from the private cache 215 of the inactive processing core 210. For example, if core 220 initiates a read memory request 270 of the victim line X 232 from the LLC 230, the controller 231 may add additional information (e.g., an identifier) on to the request to indicate a state of the victim line X 232 and where the cache line is cached. In that regard, the memory request 270 may be forward (e.g., snooping forward) by the controller 231 to the private L2 cache memory 215 of the inactive processing core 210 for the active core 220 to read the cache line X 232 installed therein.

For example, the "snoop forward" is a message 290 generated by the LLC controller 231 responsive to the "Read X 270" message. The purpose of the message is to ask controller 211 to provide a copy of data X 232 to the core 220.

Figure 3:
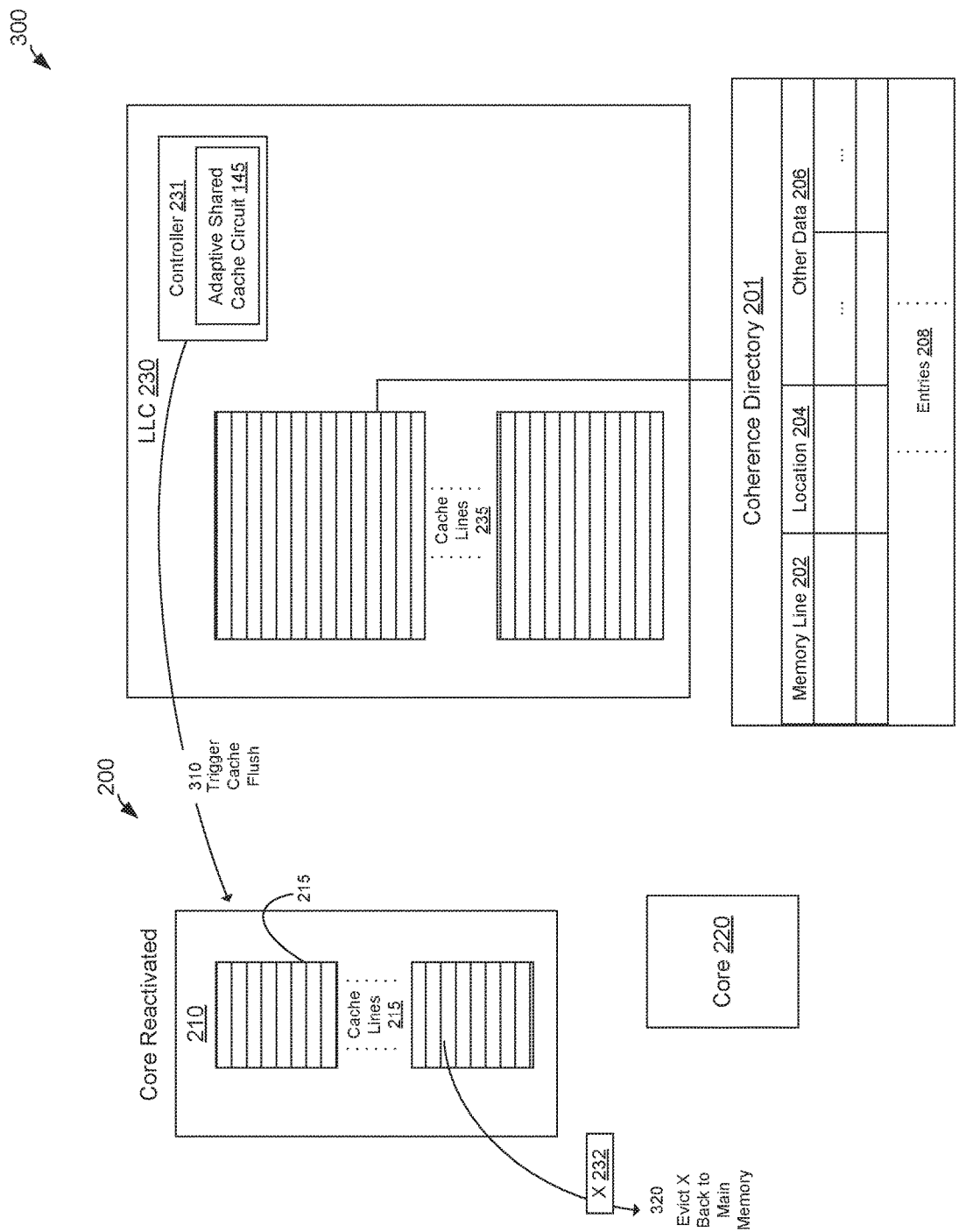
FIG. 3 illustrates another view of the system of FIG. 2 to support adaptive shared cache management according to one embodiment.

If the inactive processing core 210 becomes active again, the victim line X 232 may be evicted 320 out of the private cache backed to main memory as part of the normal cache memory operations of system 200. For example, another view 300 of system 200 is shown in FIG. 3. In this example, processing core 210 may have been reactivated. For example, the processing core 210 may be brought back to activity, which triggers 310 a flush of the private cache 215 that evicts 320 all of the private cache lines back to main memory. In another example, when the inactive processing core 210 is reactivated, the private cache 215 may start fetching new data lines, which may evict the victim line X 232 back to main memory if the private cache 215 runs out of space. Thereupon, the entry in the coherence directory 201 for the victim line X 232 is deleted to indicate that the line is no longer cached.

Figure 4:
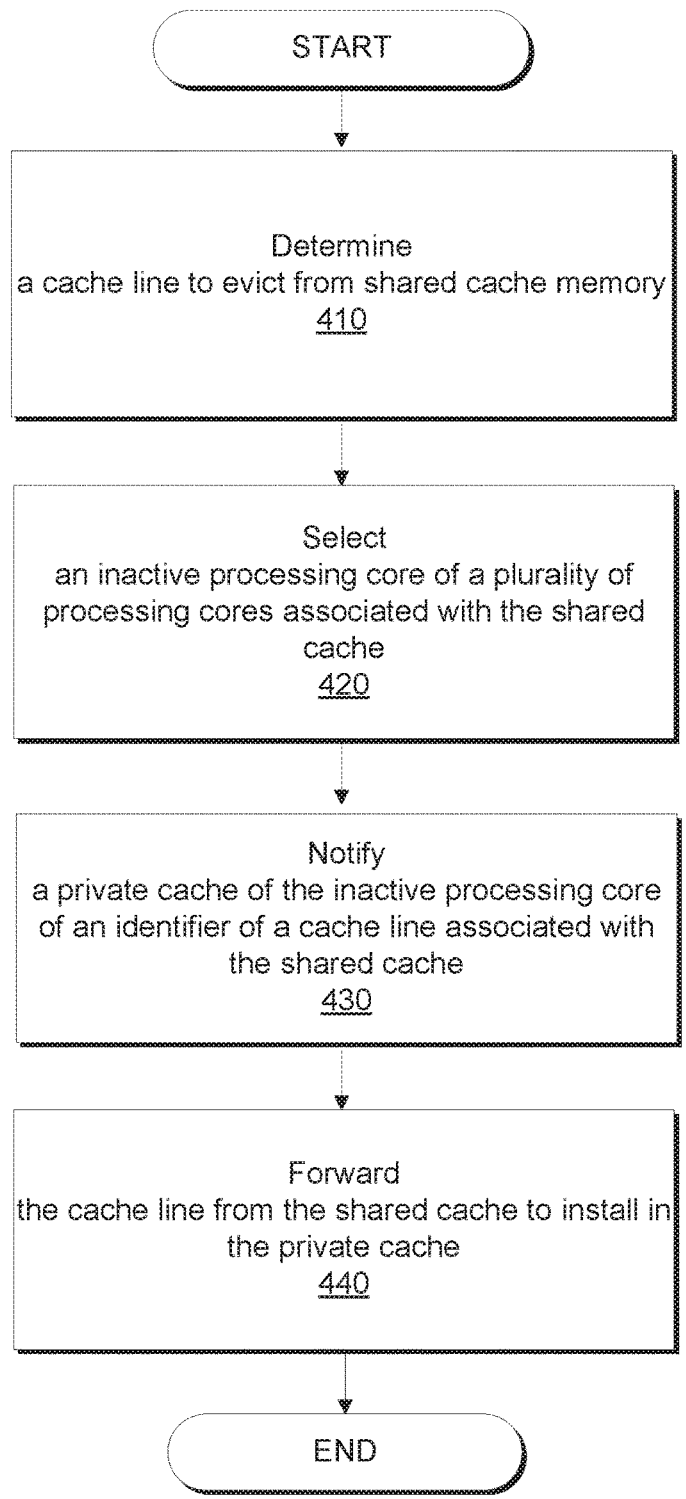
FIG. 4 illustrates a flow diagram of a method for supporting adaptive shared cache management according to one embodiment.

FIG. 4 illustrates a flow diagram of a method 400 for supporting adaptive shared cache management according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the memory controller 140 of processing device 100 in FIG. 1 as directed by the adaptive shared cache circuit 145 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 410 where a cache (victim) line 232 to evict from shared cache 230 is determined. The shared cache 230 is shared with a plurality of processing cores 210, 220. For example, victim line 232 may be selected based on a least-recently-used (LRU) algorithm. The LRU algorithm may be used to identify a victim line 232 that has not been used for a threshold amount of time. The LRU cache line may be identified based on a counter 237 or a logical clock (such as a hardware register) that can be used to determine the amount of time since the last request to the victim line.

In block 420, an inactive processing core 210 is selected from a plurality of processing cores 210, 220 associated with the shared cache 230. For example, a host operating system may include information that previously identifies which processing cores are active and inactive. This information may be used to select a potential target (e.g., inactive processing core 210) for installing the victim line 232.

In block 430, a private cache 215 of the inactive processing core 210 is notified of an identifier X 232 of the cache line 232. For example, once the inactive processing core 210 is selected, in block 420, a message 240 (e.g., prefetch hint) is transmitted to the core 210. The prefetch hint initiates a prefetch operation by the inactive processing core 210 to prefetch the victim line 232 into its private cache memory 215.

In block 440, the cache line 232 is forwarded from the shared cache 232 to install in the private cache 215. For example, a copy of the victim line X 232 is transmitted to cache controller 211 of the inactive processing core 210 to be installed in an available space in the private cache 215. Thereupon, an entry in the coherence directory 201 for the victim line X 232 is updated to indicate that the line is now located in the cache 215 of the inactive processing core 210. After forwarding the victim line X 232 to the inactive core 210, the shared cache controller 231 can safely evict the line from shared cache 235 in order to make more room.

FIG. 5A is a block diagram illustrating a micro-architecture for a processor 500 that implements techniques for supporting adaptive shared cache management functionality in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front-end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1 to implement techniques for supporting adaptive shared cache management with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrate a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
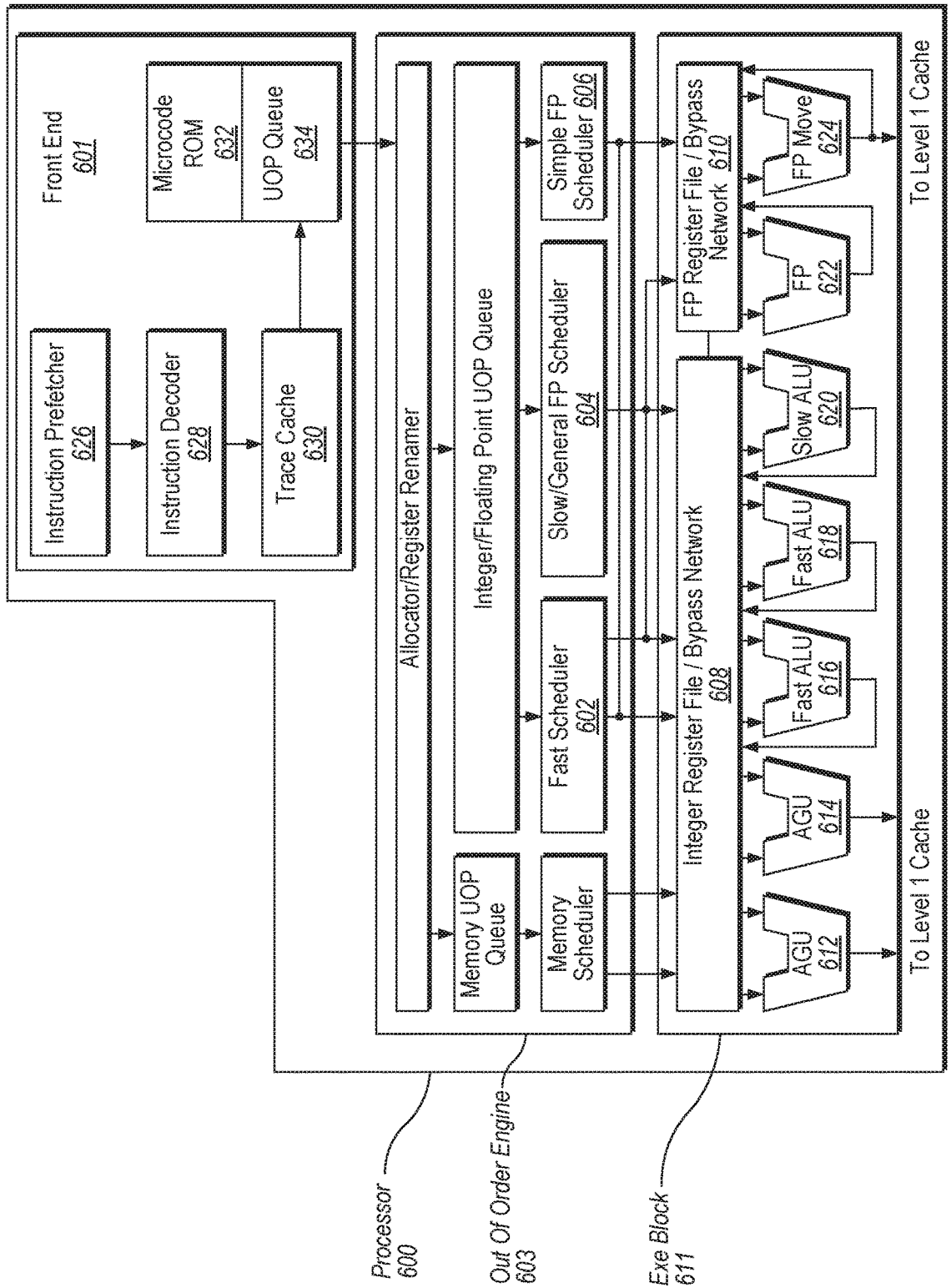
FIG. 6 is a block diagram illustrating a computer system according to one implementation.

FIG. 6 illustrates a block diagram of the micro-architecture for a processor 600 that includes logic circuits to implement techniques for supporting data compression using match-scoring functionality in accordance with one embodiment of the disclosure. In some embodiments, an instruction in accordance with one embodiment can be implemented to operate on data elements having sizes of byte, word, double word, quad word, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct microinstruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610 sit between the schedulers 602, 604, 606, and the execution units 612, 614, 616, 618, 620, 622, 624 in the execution block 611. There is a separate register file 608, 610, for integer and floating-point operations, respectively. Each register file 608, 610, of one embodiment also includes a bypass network that can bypass or forward just completed results that have not yet been written into the register file to new dependent uops. The integer register file 608 and the floating-point register file 610 are also capable of communicating data with the other. For one embodiment, the integer register file 608 is split into two separate register files, one register file for the low order 32 bits of data and a second register file for the high order 32 bits of data. The floating-point register file 610 of one embodiment has 128 bit wide entries because floating-point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating-point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. The AGUs 612, 614, executes memory load/store operations. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating-point units 622, 624, can be implemented to support a range of operands having bits of various widths. For one embodiment, the floating-point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement support adaptive shared cache circuit 145 according to embodiments of the disclosure. In one embodiment, the execution block 611 of processor 600 may include cache controller 140 for FIG. 1, for implementing techniques for supporting adaptive shared cache management functionality. In some embodiments, processor 700 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also may contain an eight multimedia SIMD register for packed data.

For the discussions below, the registers are understood to be data registers designed to hold packed data, such as 64 bits wide MMX™ registers (also referred to as 'mm' registers in some instances) in microprocessors enabled with MMX™ technology from Intel Corporation of Santa Clara, Calif. These MMX™ registers, available in both integer and floating point forms, can operate with packed data elements that accompany SIMD and SSE instructions. Similarly, 128 bits wide XMM™ registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
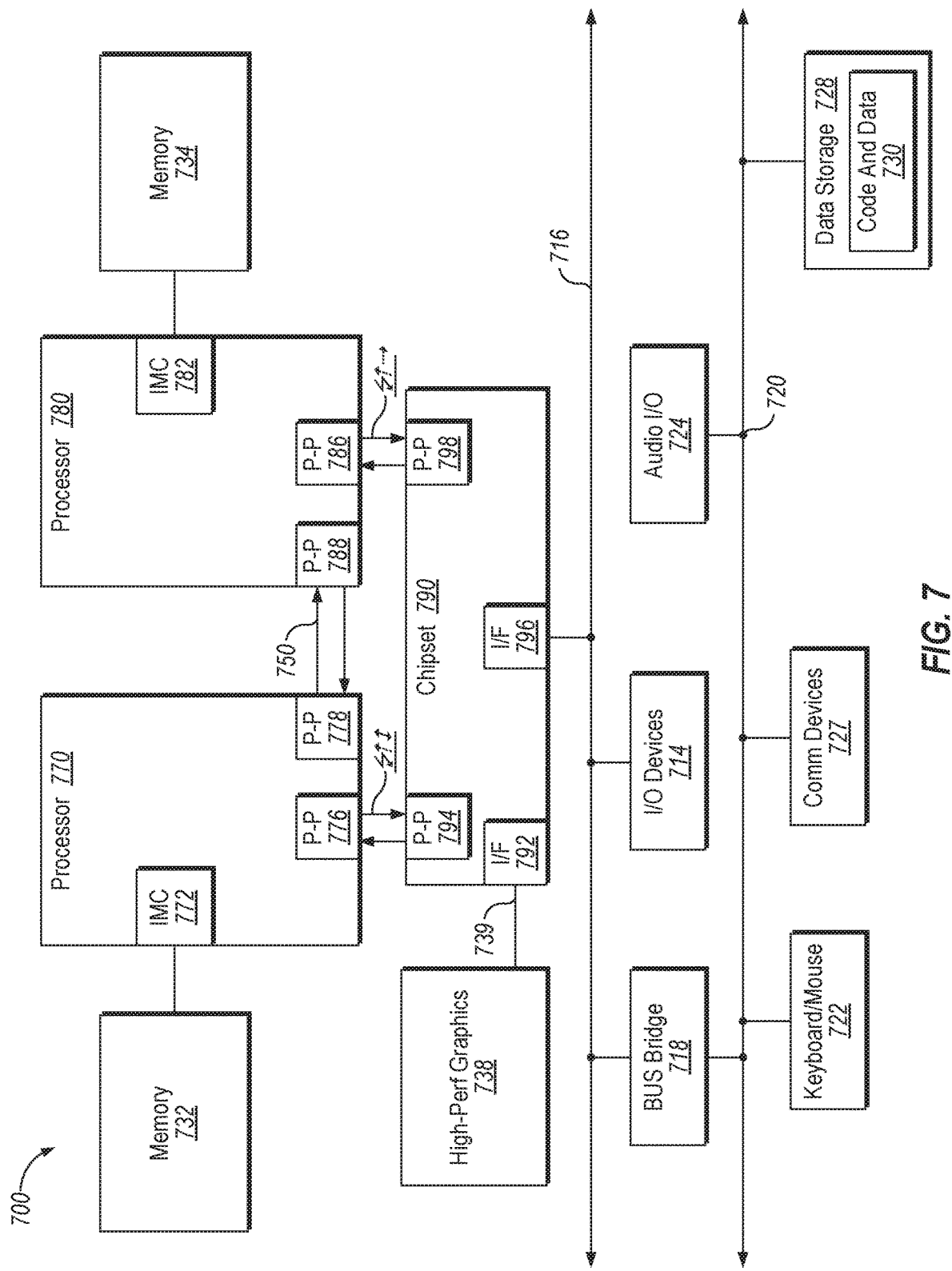
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multi-processor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting adaptive shared cache management functionality as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
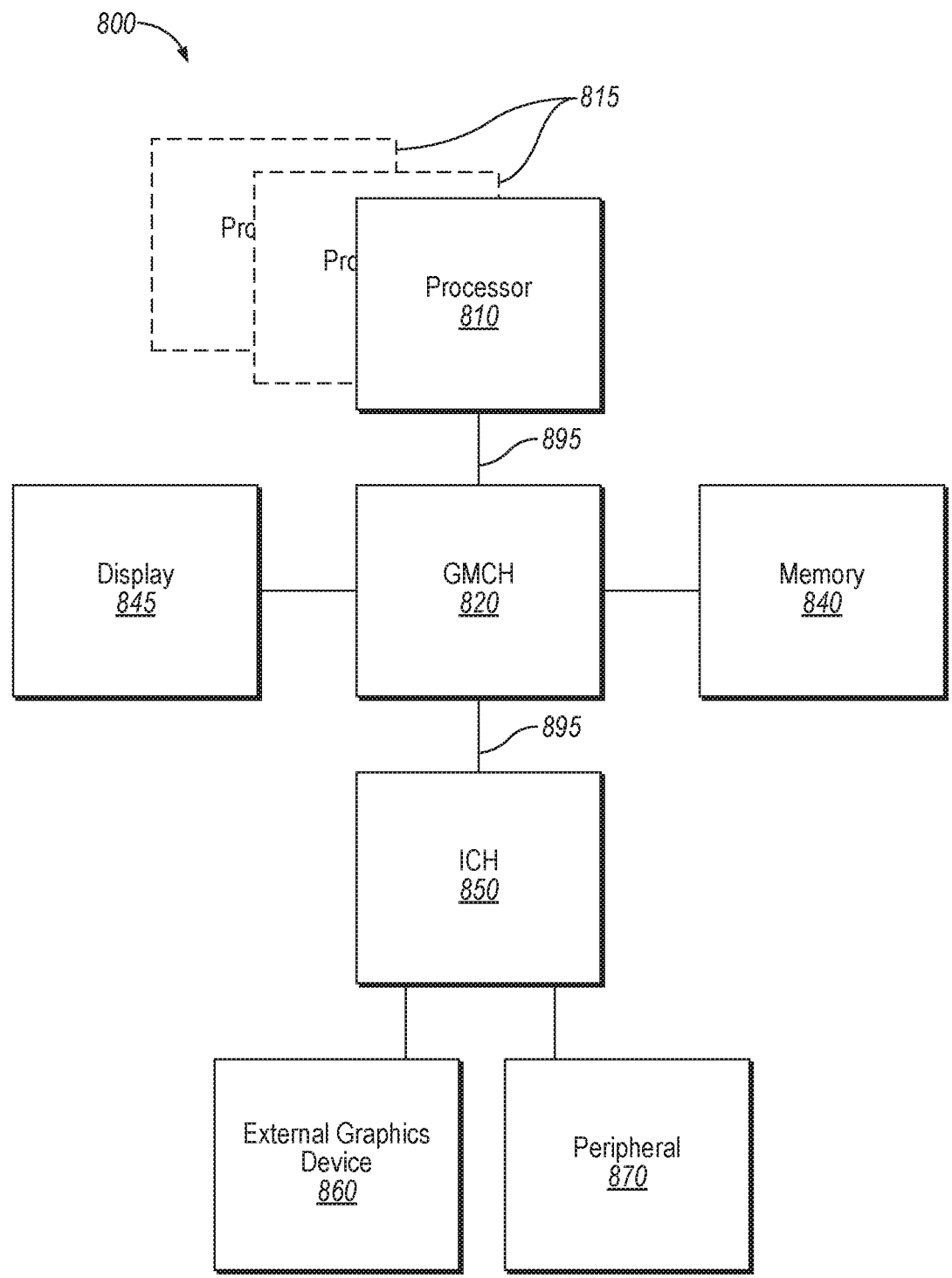
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement techniques for supporting adaptive shared cache management functionality according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
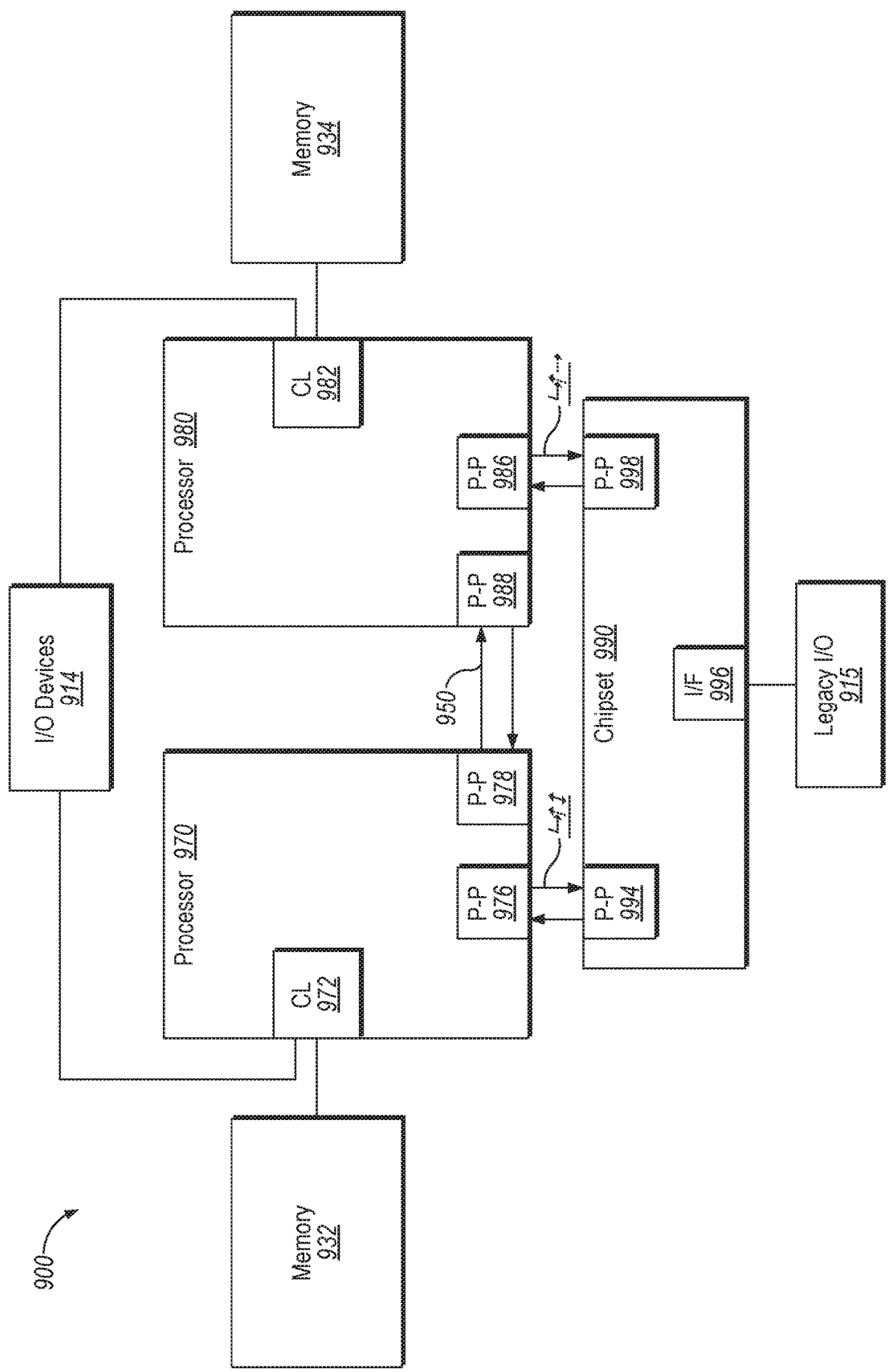
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may techniques for supporting adaptive shared cache management functionality as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
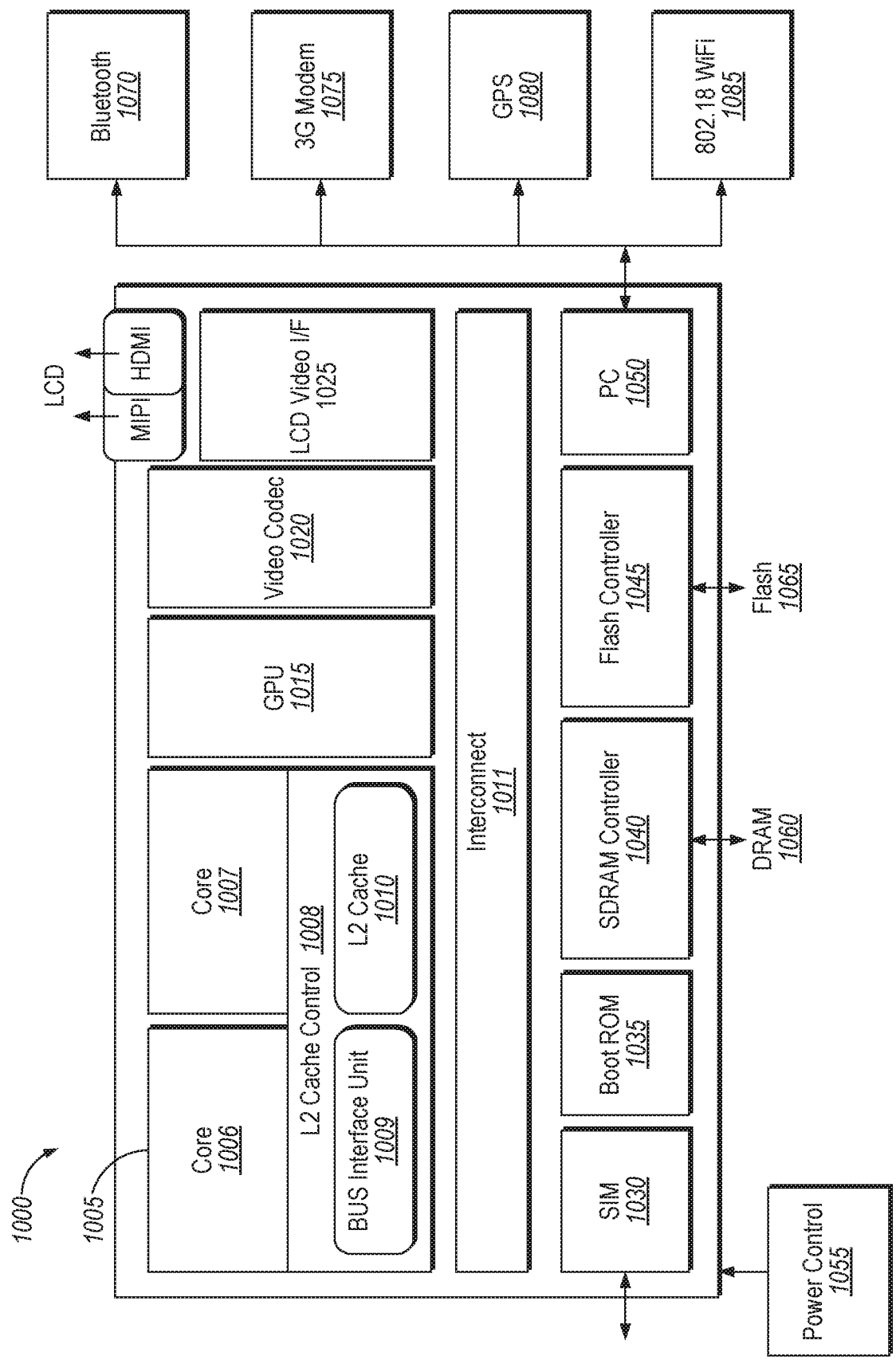
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set of one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing adaptive shared cache circuit 145 as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
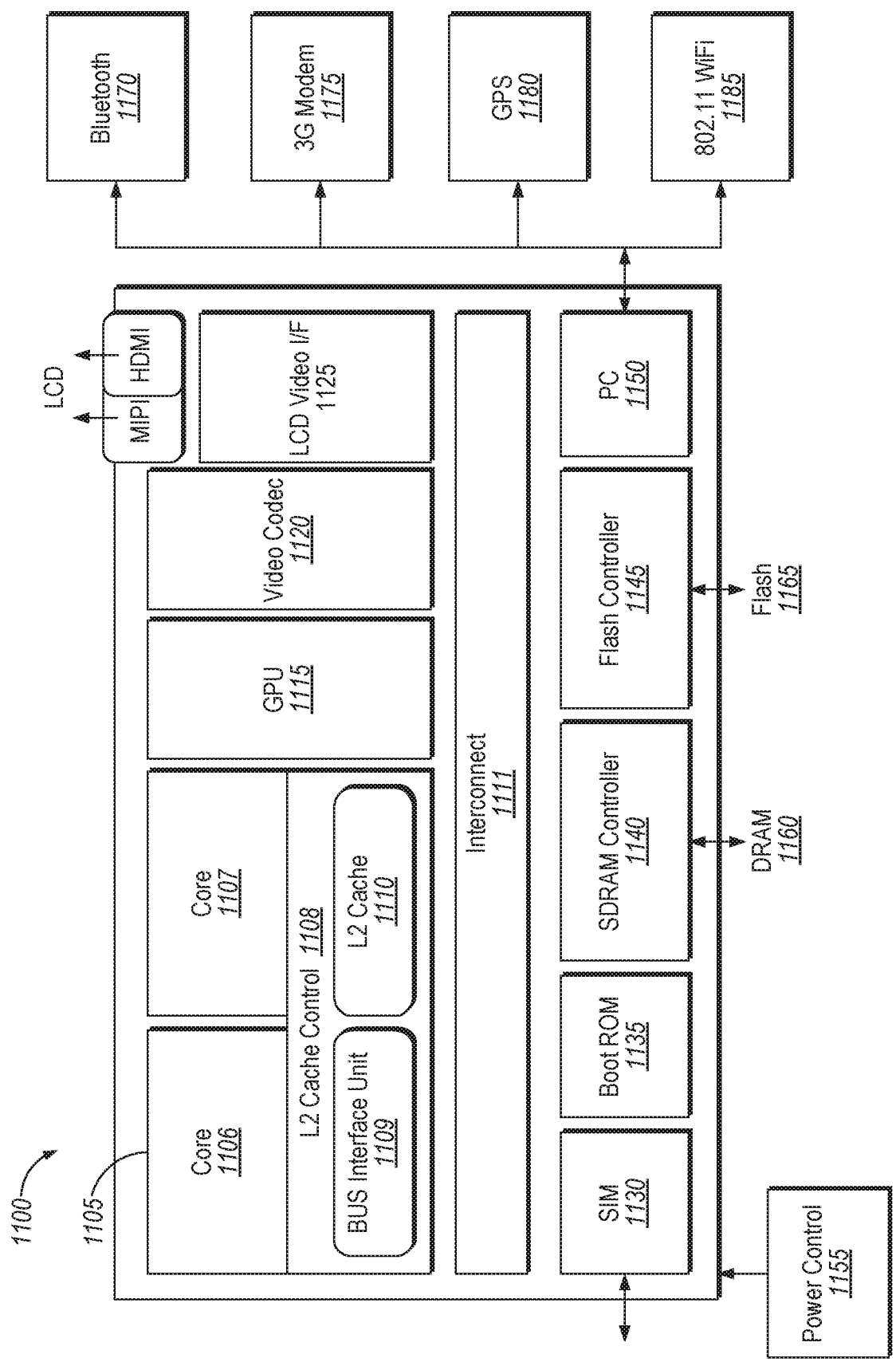
FIG. 11 is a block diagram illustrating a SoC design in which an embodiment of the disclosure may be used.

FIG. 11 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting adaptive shared cache management functionality as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
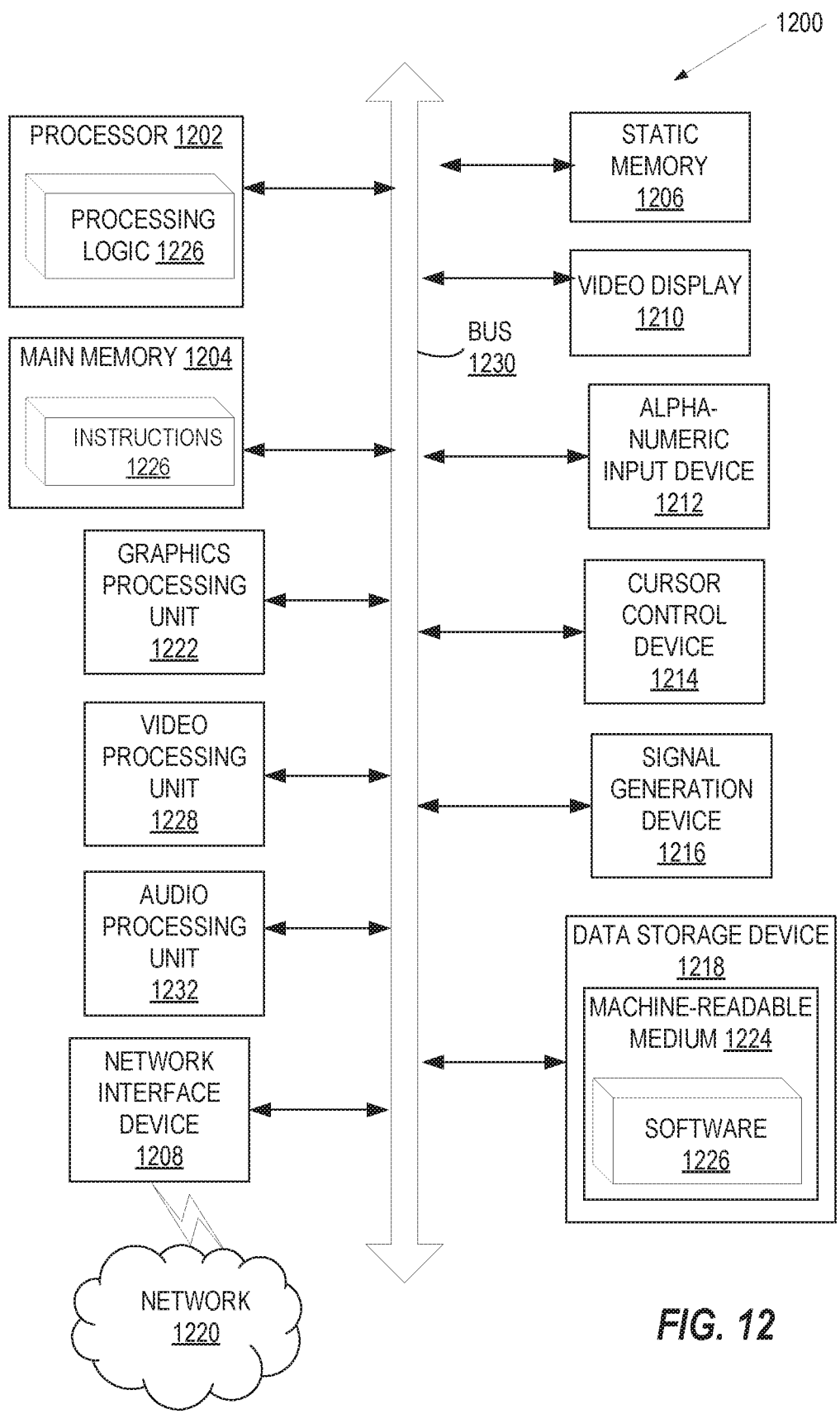
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting adaptive shared cache management functionality as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a non-transitory machine-accessible storage medium 1224 on which is stored software 1226 implementing any one or more of the methodologies of functions described herein, such as implementing adaptive shared cache circuit 145 on threads in a processing device, such as processing device 100 of FIG. 1, as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The non-transitory machine-readable storage medium 1224 may also be used to store instructions 1226 implementing adaptive shared cache circuit 145 on threads in a processing device such as described with respect to processing device 100 in FIG. 1, and/or a software library containing methods that call the above applications. While the non-transitory machine-accessible storage medium 1224 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a plurality of processing cores; and a cache controller, operatively coupled to the processing cores, to: determine a cache line to evict from a shared cache; select an inactive processing core of a plurality of processing cores associated with the shared cache; notify a private cache of the inactive processing core of an identifier of a cache line associated with the shared cache; and forward the cache line from the shared cache to the private cache.

Example 2 includes the processing device of example 1, wherein the cache controller is to identify the cache line based on a counter associated with the shared cache.

Example 3 includes the processing device of example 2, wherein the counter indicates that the identified cache line is a least-recently-used (LRU) memory space of the shared cache.

Example 4 includes the processing device of example 1, wherein the cache controller is further to: receive an access request with respect to the cache line; and forward the memory request to the private cache of the inactive processing core to retrieve the cache line.

Example 5 includes the processing device of example 1, wherein the cache controller is further to provide a message to initiate a prefetch of the cache line by the private cache of the inactive processing core.

Example 6 includes the processing device of example 1, wherein the request comprises the identifier of the cache line.

Example 7 includes the processing device of example 1, wherein the cache controller is further to trigger an eviction of the cache line in the private cache of the inactive processing core to main memory.

Example 8 includes the processing device of example 1, further comprising a memory device to implement the shared cache, wherein the shared cache is shared by the plurality of processing cores.

Example 9 includes a method comprising: determining, by a processing device, a cache line to evict from a shared cache; selecting, by the processing device, an inactive processing core of a plurality of processing cores associated with the shared cache; notifying, by the processing device, a private cache of the inactive processing core of an identifier of a cache line associated with the shared cache; and forwarding, by the processing device, the cache line from the shared cache to the private cache.

Example 10 includes the method of example 9, further comprising identifying the cache line based on a counter associated with the shared cache.

Example 11 includes the method of example 10, wherein the counter indicates that the identified cache line is a least-recently-used (LRU) memory space of the shared cache.

Example 12 includes the method of example 9, further comprising: receiving an access request with respect to the cache line; and forwarding the memory request to the private cache of the inactive processing core to retrieve the cache line.

Example 13 includes the method of example 9, further comprising providing a message to initiate a prefetch of the cache line by the private cache of the inactive processing core.

Example 14 includes the method of example 9, wherein the request comprises the identifier of the cache line.

Example 15 includes the method of example 9, further comprising triggering an eviction of the cache line in the private cache of the inactive processing core to main memory.

Example 16 includes a system comprising: a shared cache to store a plurality of cache lines; and a processing device, operatively coupled to the shared cache, to: determine a cache line to evict from a shared cache; select an inactive processing core of a plurality of processing cores associated with the shared cache; notify a private cache of the inactive processing core of an identifier of a cache line associated with the shared cache; and forward the cache line from the shared cache to the private cache.

Example 17 includes the system of example 16, wherein the processing device is further to identify the cache line based on a counter associated with the shared cache.

Example 18 includes the system of example 17, wherein the counter indicates that the identified cache line is a least-recently-used (LRU) memory space of the shared cache.

Example 19 includes the system of example 16, wherein the processing device is further to provide a message to initiate a prefetch of the cache line by the private cache of the inactive processing core.

Example 20 includes the system of example 16, wherein the processing device is further to: receive an access request with respect to the cache line; and forward the memory request to the private cache of the inactive processing core to retrieve the cache line.

Example 21 includes the system of example 16, wherein the processing device is further to provide a message to initiate a prefetch of the cache line by the private cache of the inactive processing core.

Example 22 includes the system of example 16, wherein the request comprises the identifier of the cache line.

Example 23 includes the system of example 16, wherein the processing device is further to trigger an eviction of the cache line in the private cache of the inactive processing core to main memory.

Example 24 includes a non-transitory computer-readable medium comprising instructions that, when executed by a processing device, cause the processing device to: determine, by the processing device, a cache line to evict from a shared cache; select an inactive processing core of a plurality of processing cores associated with the shared cache; notify a private cache of the inactive processing core of an identifier of a cache line associated with the shared cache; and forward the cache line from the shared cache to install in the private cache.

Example 25 includes the non-transitory computer-readable medium of example 24, wherein the processing device is further to identify the cache line based on a counter associated with the shared cache.

Example 26 includes the non-transitory computer-readable medium of example 25, wherein the counter indicates that the identified cache line is a least-recently-used (LRU) memory space of the shared cache.

Example 27 includes the non-transitory computer-readable medium of example 24, wherein the processing device is further to provide a message to initiate a prefetch of the cache line by the private cache of the inactive processing core.

Example 28 includes the non-transitory computer-readable medium of example 24, wherein the processing device is further to: receive an access request with respect to the cache line; and forward the memory request to the private cache of the inactive processing core to retrieve the cache line.

Example 29 includes the non-transitory computer-readable medium of example 24, wherein the processing device is further to provide a message to initiate a prefetch of the cache line by the private cache of the inactive processing core.

Example 30 includes the non-transitory computer-readable medium of example 24, wherein the request comprises the identifier of the cache line.

Example 31 includes the non-transitory computer-readable medium of example 24, wherein the processing device is further to trigger an eviction of the cache line in the private cache of the inactive processing core to main memory.

Example 32 includes a non-transitory, computer-readable storage medium including instructions that, when executed by a processor, cause the processor to perform the method of examples 9-15.

Example 33 includes an apparatus comprising: a plurality of functional units of a processor; means for determining a cache line to evict from a shared cache; means for selecting an inactive processing core of a plurality of processing cores associated with the shared cache; means for notifying a private cache of the inactive processing core of an identifier of a cache line associated with the shared cache; and means for forwarding the cache line from the shared cache to install in the private cache.

Example 34 includes the apparatus of example 33, further comprising the subject matter of any of examples 1-8 and 16-23.

Example 35 includes a system comprising: a memory device and a processor comprising a memory controller unit, wherein the processor is configured to perform the method of any of examples 9-15.

Example 36 includes the system of example 35, further comprising the subject matter of any of examples 1-8 and 16-23.

While the disclosure has been described respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   a plurality of processing cores; and
   a cache controller, operatively coupled to the processing cores, to:
      determine a cache line to evict from a shared cache;
      select an inactive processing core of the plurality of processing cores associated with the shared cache;
      transmit, to a private cache of the inactive processing core, a message to initiate a prefetch of the cache line by the private cache of the inactive processing core; and
      forward the cache line from the shared cache to the private cache.

2. The processing device of claim 1, wherein the cache controller is further to identify the cache line based on a counter associated with the shared cache.

3. The processing device of claim 2, wherein the counter indicates that the identified cache line is a least-recently-used (LRU) memory space of the shared cache.

4. The processing device of claim 1, wherein the cache controller is further to:
   receive an access request with respect to the cache line; and
   forward the memory request to the private cache of the inactive processing core to retrieve the cache line.

5. The processing device of claim 1, wherein the request comprises the identifier of the cache line.

6. The processing device of claim 1, wherein the cache controller is further to trigger an eviction of the cache line in the private cache of the inactive processing core to main memory.

7. The processing device of claim 1, further comprising a memory device to implement the shared cache, wherein the shared cache is shared by the plurality of processing cores.

8. A method comprising:
   determining, by a processing device, a cache line to evict from a shared cache;
   selecting, by the processing device, an inactive processing core of a plurality of processing cores associated with the shared cache;
   transmitting, by the processing device, a private cache of the inactive processing core, a message to initiate a prefetch of the cache line by the private cache of the inactive processing core; and forwarding, by the processing device, the cache line from the shared cache to the private cache.

9. The method of claim 8, further comprising identifying the cache line based on a counter associated with the shared cache.

10. The method of claim 9, wherein the counter indicates that the identified cache line is a least-recently-used (LRU) memory space of the shared cache.

11. The method of claim 8, further comprising:
receiving an access request with respect to the cache line; and
forwarding the memory request to the private cache of the inactive processing core to retrieve the cache line.

12. The method of claim 8, wherein the request comprises the identifier of the cache line.

13. The method of claim 8, further comprising triggering an eviction of the cache line in the private cache of the inactive processing core to main memory.

14. A system comprising:
a shared cache to store a plurality of cache lines; and
a processing device, operatively coupled to the shared cache, to:
determine a cache line to evict from a shared cache;
select an inactive processing core of a plurality of processing cores associated with the shared cache;
transmit, to a private cache of the inactive processing core, a message to initiate a prefetch of the cache line by the private cache of the inactive processing core; and
forward the cache line from the shared cache to the private cache.

15. The system of claim 14, wherein the processing device is further to identify the cache line based on a counter associated with the shared cache.

16. The system of claim 15, wherein the counter indicates that the identified cache line is a least-recently-used (LRU) memory space of the shared cache.

17. The system of claim 14, wherein the processing device is further to:
receive an access request with respect to the cache line; and
forward the memory request to the private cache of the inactive processing core to retrieve the cache line.

* * * * *